(12) United States Patent
Lau et al.

(10) Patent No.: US 10,523,111 B1
(45) Date of Patent: Dec. 31, 2019

(54) OVERVOLTAGE PROTECTION THRESHOLD BASED ON PREVIOUSLY SENSED SUPPLY VOLTAGE

(71) Applicant: Infineon Technologies Austria AG, Villach (AT)

(72) Inventors: Tiam Poh Lau, Singapore (SG); Marcus Schaemann, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/122,083

(22) Filed: Sep. 5, 2018

(51) Int. Cl.
*H02M 1/32* (2007.01)
*H02H 9/04* (2006.01)

(52) U.S. Cl.
CPC .............. *H02M 1/32* (2013.01); *H02H 9/045* (2013.01)

(58) Field of Classification Search
CPC ............ H02M 1/32; H02M 1/34; H02M 1/36; H02M 7/5387; H02M 3/335; H02M 3/3376; H02M 3/3378; H02H 7/1213; H02H 9/045; Y02B 70/1491
USPC ............... 363/50, 56.02, 56.05, 56.08, 56.11
See application file for complete search history.

(56) References Cited

U.S. PATENT DOCUMENTS

| | | | | |
|---|---|---|---|---|
| 2009/0267583 | A1* | 10/2009 | Hsu | H02M 3/33507 323/284 |
| 2011/0228572 | A1* | 9/2011 | Lin | G06F 1/04 363/21.18 |
| 2013/0181635 | A1* | 7/2013 | Ling | H02M 3/33507 315/297 |

\* cited by examiner

*Primary Examiner* — Yemane Mehari
(74) *Attorney, Agent, or Firm* — Shumaker & Sieffert, P.A.

(57) ABSTRACT

A device for overvoltage protection includes a gate driver module and an overvoltage protection module. The gate driver module is configured to selectively activate a switching element to provide input power to a primary side winding of a transformer for generating a target output at a secondary side winding of the transformer. The overvoltage protection module is configured to determine a transition threshold based on a previously sensed supply voltage at a voltage supply pin configured to receive power for operating the circuit from a primary side auxiliary winding of the transformer and determine the circuit is operating in an overvoltage condition when a current supply voltage at the voltage supply pin exceeds the transition threshold, wherein the current supply voltage occurs at the supply pin after the previously sensed supply voltage.

15 Claims, 5 Drawing Sheets

OVERVOLTAGE PROTECTION THRESHOLD BASED ON PREVIOUSLY SENSED SUPPLY VOLTAGE

TECHNICAL FIELD

This disclosure relates to circuitry for detecting an overvoltage, particularly, detecting an overvoltage in switching power mode converters.

BACKGROUND

Protection circuitry for detecting an overvoltage limits a maximum voltage to protect components of the protection circuitry itself and other circuitry. For example, protection circuitry can be adapted to limit a voltage at a pin of an integrated circuit to 21 volts to protect an integrated circuit when the integrated circuit has a maximum voltage rating of 24 volts. In this example, a switching power supply may be configured to supply a set-point voltage of 15 volts to the pin. By setting the protection circuitry to limit the voltage at a pin to 21 volts, the protection circuitry restricts a voltage at the pin to less than the maximum rating of 24 volts while permitting the pin to receive the set-point voltage of 15 volts.

SUMMARY

In general, this disclosure is directed to an overvoltage protection module configured to prevent an overvoltage when transitioning from a relatively high start-up voltage to a relatively low steady-state voltage. For example, the overvoltage protection module may be configured to determine a transition threshold based on a previously sensed supply voltage at a supply pin and determine an overvoltage condition has occurred using the transition threshold. In this way, the overvoltage protection module may allow circuitry to transition from the relatively high start-up voltage to the relatively low steady-state voltage while preventing an overvoltage that could damage circuitry.

In an example, a circuit for overvoltage protection includes a gate driver module and an overvoltage protection module. The gate driver module is configured to selectively activate a switching element to provide input power to a primary side winding of a transformer for generating a target output at a secondary side winding of the transformer. The overvoltage protection module is configured to determine a transition threshold based on a previously sensed supply voltage at a voltage supply pin configured to receive power for operating the circuit from a primary side auxiliary winding of the transformer and determine the circuit is operating in an overvoltage condition when a current supply voltage at the voltage supply pin exceeds the transition threshold, wherein the current supply voltage occurs at the supply pin after the previously sensed supply voltage.

In another example, a method for overvoltage protection includes selectively activating, by a circuit, a switching element to provide input power to a primary side winding of a transformer for generating a target output at a secondary side winding of the transformer, determining, by the circuit, a transition threshold based on a previously sensed supply voltage at a voltage supply pin configured to receive power for operating the circuit from a primary side auxiliary winding of the transformer, and determining, by the circuit, the circuit is operating in an overvoltage condition when a current supply voltage at the voltage supply pin exceeds the transition threshold, wherein the current supply voltage occurs at the supply pin after the previously sensed supply voltage.

In another example, a power converter system includes a transformer comprising a primary side winding, a primary side auxiliary winding, and a secondary side winding, a voltage supply pin configured to receive power for operating the power converter circuit from the primary side auxiliary winding, a switching element configured to establish a channel providing input power to the primary side winding when activated, a gate driver module configured to selectively activate the switching element to generate a target output at the secondary side winding, and an overvoltage protection module. The overvoltage protection module is configured to determine a transition threshold based on a previously sensed supply voltage at the voltage supply pin, and determine the circuit is operating in an overvoltage condition when a current supply voltage at the voltage supply pin exceeds the transition threshold, wherein the current supply voltage occurs at the supply pin after the previously sensed supply voltage.

Details of these and other examples are set forth in the accompanying drawings and the description below. Other features, objects, and advantages will be apparent from the description and drawings, and from the claims.

DETAILED DESCRIPTION

Figure 1:
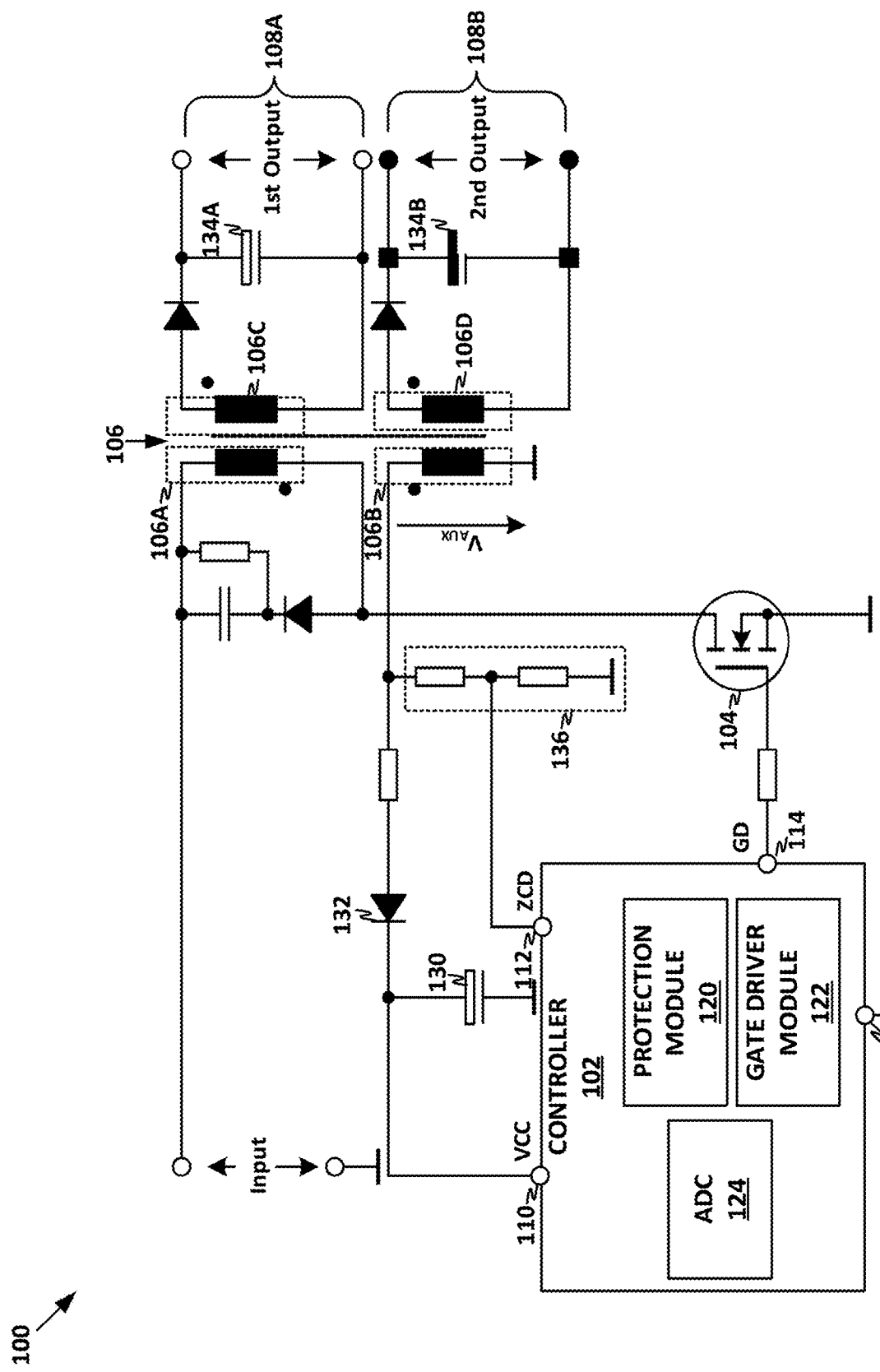
FIG. 1 is a block diagram illustrating a system with overvoltage protection that is based on a previously sensed supply voltage in accordance with one or more techniques of this disclosure.

Some systems may use a zero-crossing detection pin of an integrated circuit for a switching mode power converter (e.g., a flyback converter) to detect an output overvoltage protection event. However, if the secondary side voltage regulator circuit is damaged, the primary auxiliary winding or ZCD pin voltage could have "double knee point" (see FIG. 3), which can cause the flyback controller to measure lower than actual main output voltage if the sensing is based on the ZCD pin voltage at the knee point nearest to the first zero-crossing. Measuring the lower than actual main output voltage may be considered a safety risk in case an output overvoltage protection event occurs and the system could not protect the output capacitor from being overcharged to a voltage higher than a voltage rating of the output capacitor.

Some systems may use a $V_{CC}$ overvoltage protection (OVP) threshold that is configured above the $V_{CC}$ turn-on threshold (e.g. 20 V) to protect the IC (e.g. 24 V). In such systems, the $V_{CC}$ OVP threshold (e.g., 21 V) may be too high to provide adequate protection of the output from overcharging due to the double knee point" scenario described above. For instance, the $V_{CC}$ voltage at output set-point may be designed to be around 15 V for a $V_{CC}$ OVP threshold of 21 V. As such, the $V_{CC}$ OVP threshold may cause such systems to permit the $V_{CC}$ voltage to extend to 21 V, which may result in approximately 140% of a high output voltage set-point design. However, the output capacitor rating may be selected based on approximately 125-135% of a high output voltage set-point design, for instance, to 63 V capacitor rating for a 48V output set-point design. As such, a single or static $V_{CC}$ OVP threshold set to protect the IC may be too high to provide adequate protection of the output from overcharging due to the double knee point" scenario described above.

To address the foregoing issues, some systems may be configured to use ZCD output voltage sensing always before the first knee point. However, such systems may be inaccurate due to ZCD ringing and across wide output load range. Some systems may use ZCD output voltage sensing at the knee point with a special handling of the double knee point" scenario described above. However, such systems may be complicated, especially for a primary side regulated constant voltage output (PSR CV) type controller. Some systems may be designed with a higher $V_{CC}$ during steady state (e.g. 20 V instead of 15 V) to reduce the gap to e.g. an OVP at 21V. However, such systems may have higher losses compared to systems designed with lower $V_{CC}$ during steady state (e.g. 15 V instead of 20 V), worse efficiency, and higher IC temperature, which may result in thermal issues. Some systems may detect a fault on secondary side and provide feedback to the primary side. However, such systems may use additional circuitry on the secondary side, which may result in a higher bill of material (BOM) and higher cost compared to systems that omit the additionally circuitry on the secondary side.

In accordance with techniques described herein, a system may use an overvoltage protection threshold that is based on a previously sensed supply voltage at a $V_{CC}$ pin that protects the output from overcharging when the "double knee point" scenario occurs. For example, in addition to using a $V_{CC}$ overvoltage protection (OVP) threshold that is configured above the $V_{CC}$ turn-on threshold (e.g. 20 V) to protect the IC (e.g. 24 V), the system may use a transition threshold set to provide overvoltage protection configured for detecting the double knee point" scenario described above while permitting a voltage at the $V_{CC}$ pin to dynamically adjust to accommodate an output set-point design. For example, the transition threshold may be set to decrease from a start-up voltage (e.g., 21 V) to a steady state voltage (18 V). In this way, the system may allow circuitry to transition from the relatively high start-up voltage to the relatively low steady-state voltage while preventing an overvoltage that could damage circuitry.

FIG. 1 is a block diagram illustrating a system 100 with overvoltage protection that is based on a previously sensed supply voltage in accordance with one or more techniques of this disclosure. FIG. 1 shows system 100 which includes controller 102, switching element 104, transformer 106, and outputs 108A-108B (collectively, secondary side outputs 108). As shown, output 108A may include output capacitor 134A and output 108B may include output capacitor 134B. Although FIG. 1 illustrates 2 outputs, in some examples, a system may include one or more than two outputs. System 100 may include additional components than those shown.

Switching element 104 may be configured to establish a channel providing input power to primary side winding 106A when activated (e.g., switched in). For example, switching element 104 may be switched in such that current output from primary winding 106A flows through switching element 104. In some examples, switching element 104 may be switched out such that current output from primary winding 106A is prevented to flow through switching element 104. Examples of switching element 104 may include, but are not limited to, silicon-controlled rectifier (SCR), a Field Effect Transistor (FET), and bipolar junction transistor (BJT). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NPN, heterojunction, or any other type of BJT, or any combination of the same. It should be understood that switching element 104 may be a high side switch or low side switch. Additionally, switching element 104 may be voltage-controlled and/or current-controlled. Examples of current-controlled switching elements may include, but are not limited to, gallium nitride (GaN) MOSFETs, BJTs, or other current-controlled elements.

Controller 102 may be configured to drive switching element 104 to provide input power to primary side winding 106A for generating a target output at outputs 108. In some examples, controller 102 may be implemented as a single or multiple integrated circuit (IC) packages. As shown, controller 102 may include $V_{CC}$ pin 110, ZCD pin 112, gate driver (GD) pin 114, and ground (GND) pin 116. Controller 102 may include protection module 120, gate driver module 122, and analog-to-digital converter (ADC) 124. Controller 102 may include an analog circuit. In some examples, controller 102 may be a microcontroller on a single integrated circuit containing a processor core, memory, inputs, and outputs. For example, controller 102 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller 102 may be a combination of one or more analog components and one or more digital components.

ZCD pin 112 may be configured to receive an indication of a voltage at auxiliary winding 106B. In some examples, ADC 124 may convert the indication of voltage received at ZCD pin 112 into a digital value suitable for use by protection module 120 and/or gate driver module 122. As shown, the voltage applied to ZCD pin 112 may be an output of voltage divider 136. Gate driver module 122 may use a voltage at ZCD pin 112 for zero-crossing detection.

$V_{CC}$ pin 110 may be configured to receive power from auxiliary winding 106B to power controller 102. In some examples, ADC 124 may convert a supply voltage received at $V_{CC}$ pin 110 into a digital value suitable for use by protection module 120 and/or gate driver module 122. As shown, $V_{CC}$ pin 110 may receive an output from auxiliary winding 106B via diode 132. In some examples, capacitor 130 may be connected to $V_{CC}$ pin 110.

Gate driver (GD) pin 114 may be configured to output a signal to a control node (e.g., gate) of switching element 104. In some examples, a gate driver may be configured to receive an output from GD pin 114 and to generate a signal to drive switching element 104.

Gate driver module 122 may be configured to selectively activate switching element 104 to provide input power to primary side winding 106A for generating a target output at secondary side winding 106C. In some examples, gate driver module 122 may activate switching element 104 to provide a target output at secondary side winding 106D. In some examples, gate driver module 122 may activate switching element 104 based on a zero crossing detection (ZCD) voltage at ZCD pin 112.

Protection module 120 may be configured to determine a transition threshold based on a previously sensed supply voltage at $V_{CC}$ pin 110. In this example, protection module 120 may determine the circuit is operating in an overvoltage condition when a current supply voltage at $V_{CC}$ pin 110 exceeds the transition threshold. In response to determining system 100 is operating in an overvoltage condition, protection module 120 may deactivate gate driver module 122.

Figure 2:
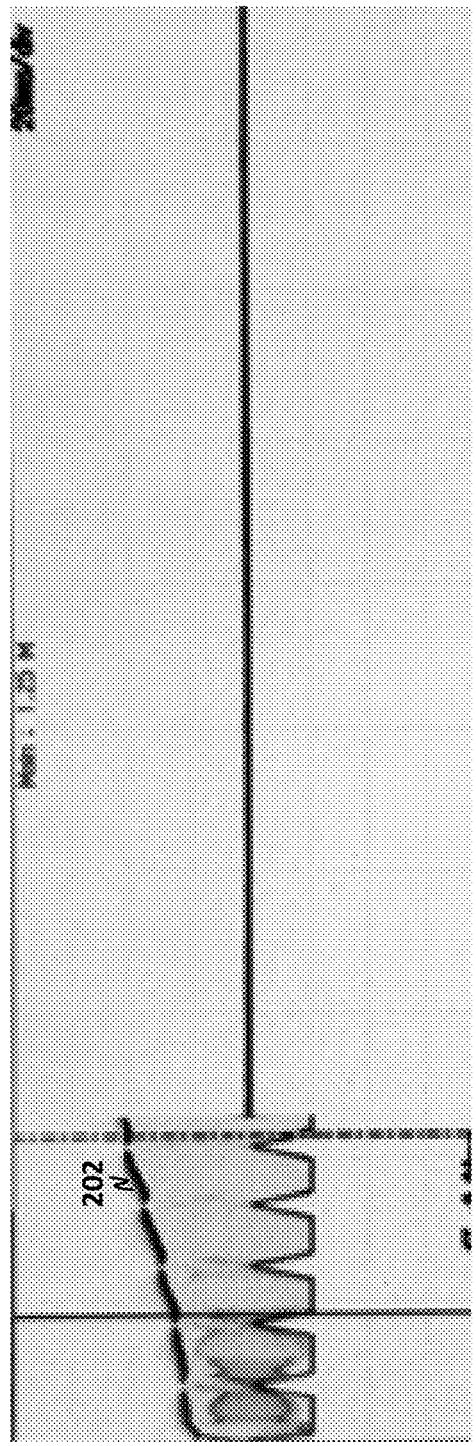
FIG. 2 is a graph illustration of an overvoltage in accordance with one or more techniques of this disclosure.

FIG. 2 is a graph illustration of an overvoltage in accordance with one or more techniques of this disclosure. In the example of FIG. 2, a secondary side voltage regulator circuit is damaged, and a voltage at ZCD pin 112 has a double knee point (see FIG. 3), which can cause controller 102 to measure lower than actual main output voltage at outputs 108 if the sensing is based on ZCD pin 112 voltage at the knee point nearest to the first zero-crossing. Measuring the lower than actual main output voltage at outputs 108 may be considered a safety risk in case an output overvoltage protection event occurs and the system could not protect output capacitor 134A and/or output capacitor 134B from being overcharged to a voltage higher than a voltage rating of the output capacitor. For example, as shown, voltage 202, which may correspond to a voltage at outputs 108, continues to rise, which could result in an overvoltage event at output capacitor 134A and/or output capacitor 134B.

Figure 3:
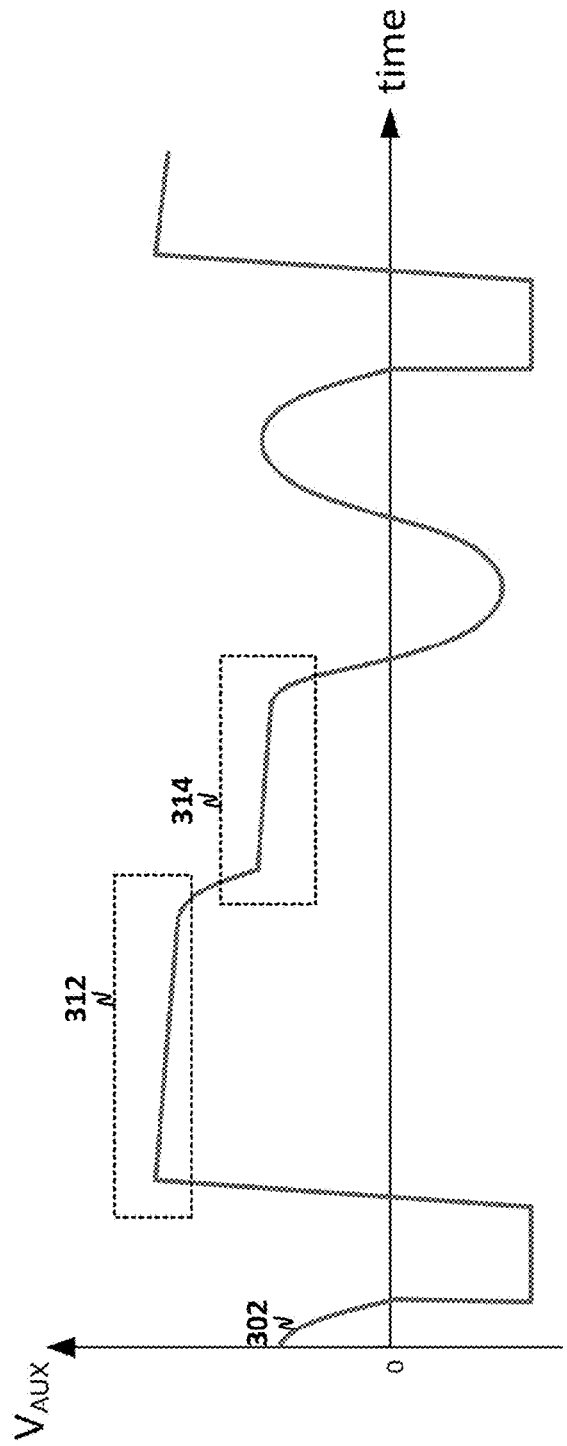
FIG. 3 is a graph illustration of a double knee point in accordance with one or more techniques of this disclosure.

FIG. 3 is a graph illustration of a double knee point in accordance with one or more techniques of this disclosure. FIG. 3 illustrates an example double knee point that may cause the overvoltage event illustrated in FIG. 2. Controller 102 may be configured to determine a voltage at outputs 108 based on an auxiliary voltage 302 at ZCD pin 112. Specifically, for example, controller 102 may be configured to determine the voltage at output 108A based on a knee point (e.g., peak) in region 312 of auxiliary voltage 302. However, as controller 102 may be configured to use a knee point that is closest to the first zero crossing, gate driver module 122 may instead determine the voltage at output 108A based on a knee point (e.g., peak) in region 314 of auxiliary voltage 302. As shown, the knee point in region 314 is smaller than the knee point in region 312. As such, gate driver module 122 may overcharge components (e.g., output capacitor 108A, output capacitor 108B, etc.) connected to one or more of outputs 108 due to the double knee point scenario.

Figure 4:
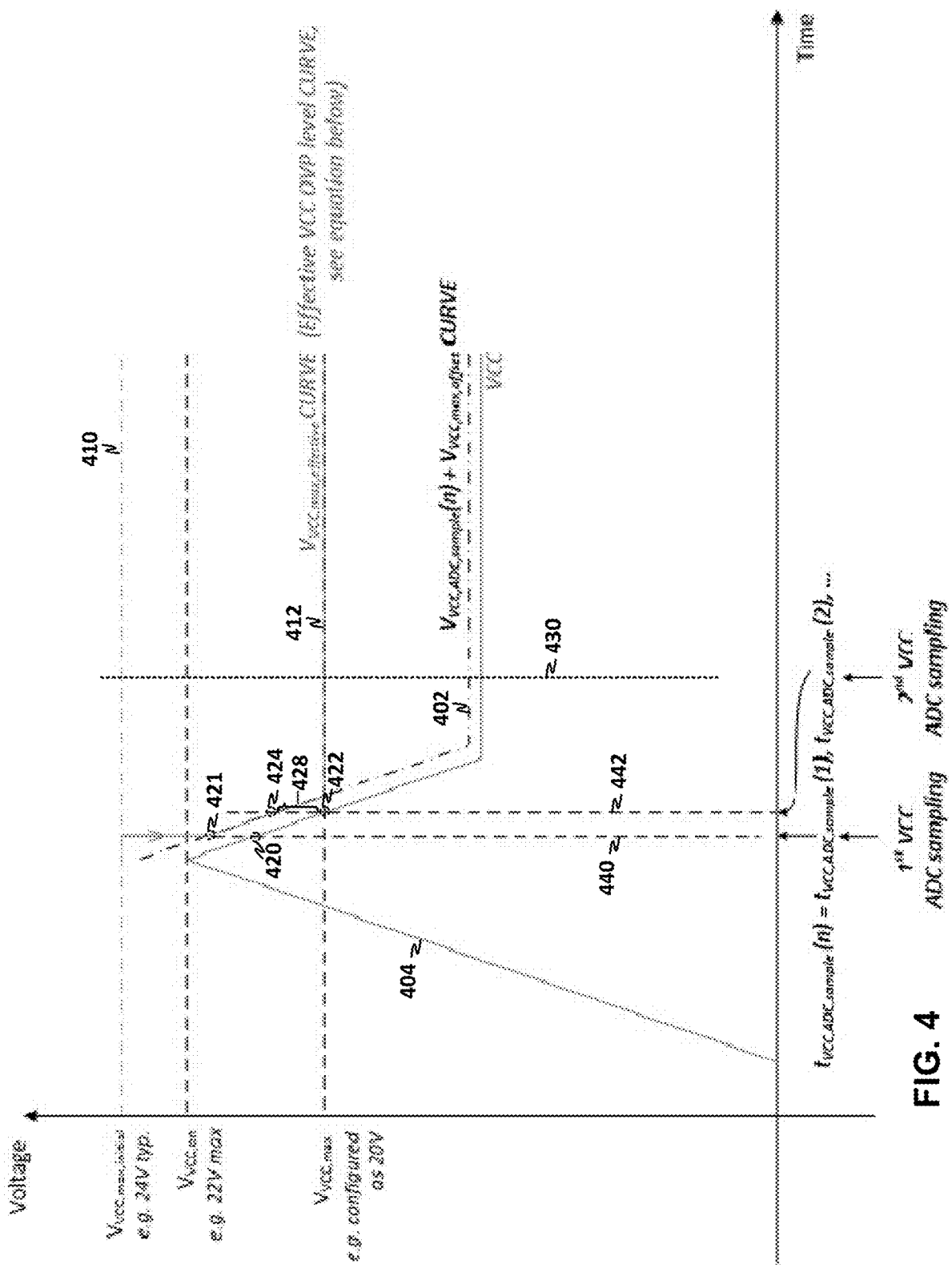
FIG. 4 is a graph illustration of a transition threshold in accordance with one or more techniques of this disclosure.

FIG. 4 is a graph illustration of a transition threshold 402 in accordance with one or more techniques of this disclosure. In addition to relying on a voltage at ZCD pin 112 to provide overvoltage protection, overvoltage protection module 120 may also use voltage 404 at $V_{CC}$ pin 110. To provide protection of outputs 108 from being overcharged using $V_{CC}$ pin 110, protection module 120 may allow the $V_{CC}$ OVP threshold setting below the $V_{CC}$ turn-on threshold by using the following technique:

$$V_{VCC,max,effective}(n) = \max\{\min[V_{VCC,max,initial}, V_{VCC,ADC,sampling}(n) + V_{VCC,max,offset}, V_{VCC,max,effective}(n-1)], V_{VCC,max}\}$$ (Equation 1)

Where, $V_{VCC,max,effective}(n)$ is transient threshold 402 for a current sample (n) 442, $V_{VCC,max,effective}(n-1)$ is transient threshold 402 for previous sample (n-1) 440, $V_{VCC,max,offset}$ is the allowable $V_{CC}$ AC offset in the transition of $V_{VCC,max,effective}$ from $V_{VCC,max,initial}$ and $V_{VCC,max}$. For example, $V_{VCC,max,offset}$ can be configured as 1 Volt. $V_{VCC,max,initial}$ is the initial $V_{CC}$ OVP threshold. $V_{VCC,max}$ is the final $V_{CC}$ OVP threshold. $V_{VCC,ADC,sampling}(n)$ is the ADC results of the $V_{CC}$ voltage over sampling number of n (e.g., current sample (n) 442)). $V_{VCC,ADC,sampling}(n-1)$ is the last previous ADC results of the $V_{CC}$ voltage over sampling number of n-1 (e.g., previous sample (n-1) 440)). If $V_{VCC,max,effective} \neq V_{VCC,max}$, when n≥defined maximum number of ADC samples (e.g., 100) then $V_{VCC,max,effective} = V_{VCC,max}$.

In the example illustrated in FIG. 4, protection module 120 determines startup threshold 410 (e.g., $V_{VCC,max,initial}$) as 24 volts. Protection module 120 determines a previously sensed supply voltage 420 (e.g., $V_{VCC,ADC,sampling}(n-1)$) at previous sample (n-1) 440 as 21 volts. For example, ADC 124 may detect previously sensed supply voltage 420 and output a representation of previously sensed supply voltage 420 to protection module 120. Protection module 120 may add offset 428 (e.g., 1 volt) to previously sensed supply voltage 420 to generate an offset threshold for previous sample (n-1) 440. In this example, protection module 120 previously determined transient threshold 421 ($V_{VCC,max,effective}(n-1)$) for previous sample (n-1) 440 as offset threshold (e.g., 22 volts).

Protection module 120 determines current supply voltage 422 (e.g., $V_{VCC,ADC,sampling}(n)$) at current sample (n) 442 as 20 volts. For example, ADC 124 may detect current supply voltage 422 and output a representation of current supply voltage 422 to protection module 120. Protection module 120 may add offset 428 (e.g., 1 volt) to current supply voltage 422 to generate offset threshold 424.

According to Equation 1, in the example illustration of FIG. 4, protection module 120 determines the minimum of the startup threshold (e.g., 24 volts), previous transient threshold 421 ($V_{VCC,max,effective}(n-1)$) for previous sample (n-1) 440 (e.g., 22 volts), and offset threshold 424 (e.g., 21 volts) to generate an offset minimum threshold. In this example, protection module 120 determines the maximum of steady state threshold 412 and the offset minimum threshold (which is offset threshold 424 in this example) as the offset minimum threshold. In response to determining the maximum of a steady state threshold 412 and the offset minimum threshold is the offset minimum threshold (which is offset threshold 424 in this example), protection module 120 sets the offset minimum threshold (e.g., offset threshold 424) as transient threshold 402 for current sample (n) 442.

In any case, protection module 120 may be configured to determine whether system 100 is operating in an overvoltage condition. For example, protection module 120 determines a current supply voltage 422 (e.g., $V_{VCC,ADC,sampling}(n)$) at current sample (n) 442 as 20 volts. For example, ADC 124 may detect current supply voltage 422 and output a representation of current supply voltage 422 to overvoltage protection module 120. In this example, protection module 120 may include a comparator configured to determine whether current supply voltage 422 of voltage 404 at $V_{CC}$ pin 110 exceeds transition threshold 402. Again, transient threshold 402 may be determined using Equation 1.

Protection module 120 may be configured to determine transition threshold 402 before a time duration initiated at a startup of system 100 exceeds time threshold 430. In this example, after time duration is initiated at the startup of the circuit exceeds time threshold 430, protection module 120 may determine system 100 is operating in the overvoltage condition when the current supply voltage exceeds the steady state threshold 412. For example, protection module 120 may refrain from sampling voltages and from calculating Equation 1 and instead determine system 100 is operating in the overvoltage condition when the current supply voltage exceeds the steady state threshold 412. While the above examples of Equation 1 uses sampled voltages, sensed voltages that are determined without a sample and hold may be used.

In any case, in response to determining that voltage 404 at $V_{CC}$ pin 110 exceeds transition threshold 402, protection module 120 may determine system 100 is operating in an overvoltage condition. In response to determining system 100 is operating in the overvoltage condition, protection module 120 may deactivate gate driver module 122 while the current supply voltage of voltage 404 exceeds startup threshold 410.

In the example of FIG. 4, system 100 may be configured to perform techniques described herein to smartly adapt a $V_{CC}$ pin 110 voltage level in transition based on an actual (e.g., sensed) voltage measurement to provide maximum overvoltage protection without miss-triggering. One or more aspects of techniques described herein may be relatively easy to implement (e.g., on digital or analog based IC). Moreover, one or more aspects of techniques described herein may permit transition handling that is independent from hardware dimensioning and tolerance (e.g. $V_{CC}$ capacitor selection and tolerance, IC current consumption tolerance, $V_{CC}$ OVP setting, etc.). One or more aspects of techniques described herein may improve output overvoltage protection, which is especially important for Primary-Side-Regulation (PSR) constant voltage (CV) type controller if the "double knee-point" event described herein occurs on ZCD pin 112.

Figure 5:
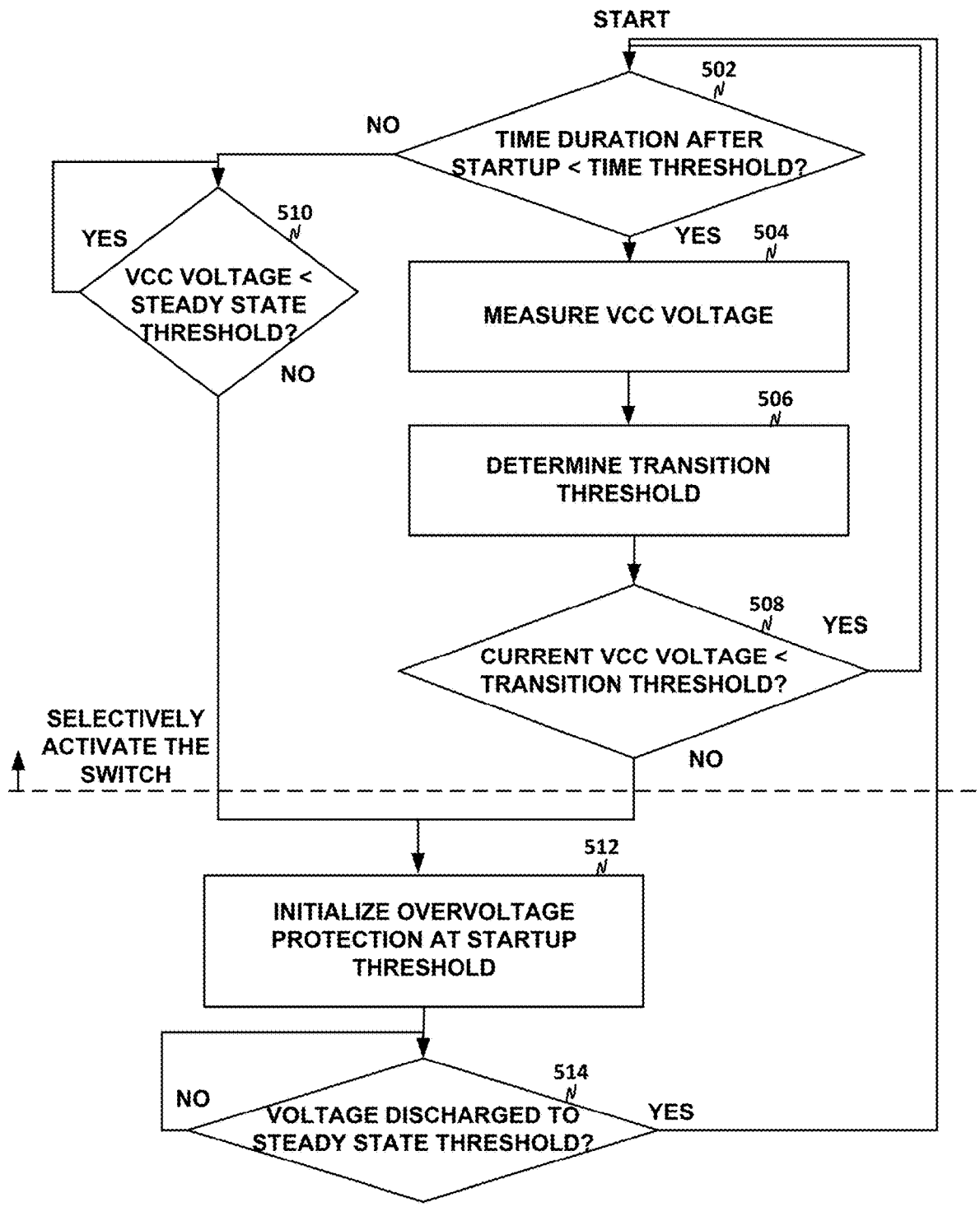
FIG. 5 is a flow diagram for a method for providing overvoltage protection to permit a startup voltage and a steady state voltage in accordance with one or more techniques of this disclosure.

FIG. 5 is a flow diagram for a method for providing overvoltage protection to permit a startup voltage and a steady state voltage in accordance with one or more techniques of this disclosure. FIG. 5 is described in the context of FIGS. 1-4 for exemplary purposes only. In operation, protection module 120 determines whether a time duration after startup is less than time threshold 430 (502).

In response to determining time duration after startup is less than time threshold 430 ("YES" of step 502), ADC 124 measures current supply voltage 422 (504). Protection module 120 determines transition threshold 402 for current sample (n) 442 (506). For example, protection module 120 determines transition threshold 402 for current sample (n) 442 as offset minimum threshold 424 based on Equation 1. Protection module 120 determines whether current supply voltage 422 of voltage 404 at $V_{CC}$ pin 110 is less than transition threshold 402 (508). In response to determining current supply voltage 422 of voltage 404 at $V_{CC}$ pin 110 is less than transition threshold 402 ("YES" of step 508), the process continues to step 502.

In response, however, to determining current supply voltage 422 of voltage 404 at $V_{CC}$ pin 110 is not less than transition threshold 402 ("NO" of step 508), protection module 120 causes gate driver module 122 to refrain from activating (e.g., switching in) switching element 104 and initializes overvoltage protection at startup threshold 410 (512). Protection module 120 determines whether voltage 404 is discharged to steady state threshold 412 (514). In response to determining voltage 404 is not discharged to steady state threshold 412 ("NO" of step 514), the process continues to step 514. In response, however, to determining voltage 404 is discharged to steady state threshold 412 ("YES" of step 514), the process continues to step 502.

In response, however, to determining time duration after startup is not less than time threshold 430 ("NO" of step 502), protection module 120 determines whether voltage 404 is less than steady state threshold 412 (510). In response to determining voltage 404 is less than steady state threshold 412 ("YES" of step 510), the process continues to step 510. In response, however, to determining voltage 404 is not less than steady state threshold 412 ("NO" of step 510), the process continues to step 512.

Figure 6:
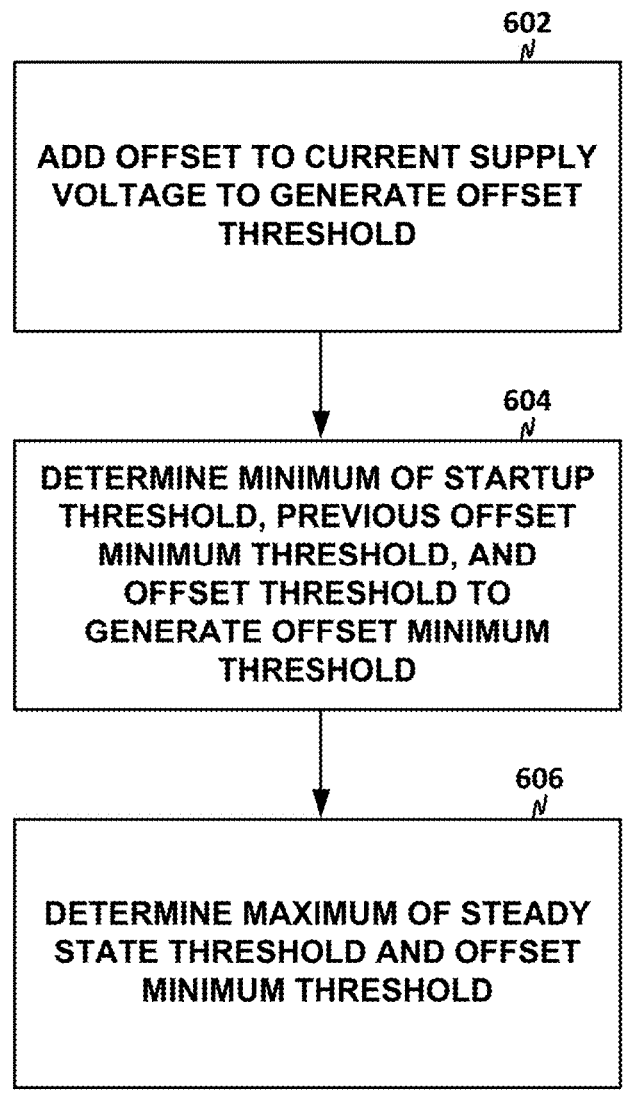
FIG. 6 is a flow diagram for a method for determining a transient threshold in accordance with one or more techniques of this disclosure.

FIG. 6 is a flow diagram for a method for determining a transient threshold in accordance with one or more techniques of this disclosure. FIG. 6 is described in the context of FIGS. 1-5 for exemplary purposes only. FIG. 6 may be an example of step 506 of FIG. 5. In operation, protection module 120 adds an offset to a current supply voltage to generate an offset threshold (602). For example, protection module 120 adds offset 428 to current supply voltage 422 to generate offset threshold 424. Protection module 120 determines a minimum of a startup threshold, the previous offset threshold minimum threshold, and the offset threshold to generate an offset minimum threshold (604). For example, protection module 120 determines a minimum of startup threshold 410, previous offset threshold minimum threshold 421, and the offset threshold determined in step 602 (e.g., offset threshold 424) to generate an offset minimum threshold. Protection module 120 determines a maximum of a steady state threshold and offset minimum threshold (604). For example, protection module 120 determines a maximum of steady state threshold 412 and the offset minimum threshold determined in step 604 (e.g., offset threshold 424).

While a device has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The techniques of this disclosure may be implemented in a device or article of manufacture comprising a computer-readable storage medium. The term "processing circuitry," as used herein may refer to any of the foregoing structure or any other structure suitable for processing program code and/or data or otherwise implementing the techniques described herein. Elements of controller 102 and the processing circuitry of controller 102 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein. Processing circuitry may also include analog components arranged in a mixed-signal IC. For example, the function of an ADC may be replaced by analog components like comparators which results in the same or a similar technique.

Controller 102 and the processing circuitry of controller 102 may include memory. One or more memory devices of the memory may include any volatile or non-volatile media, such as a RAM, ROM, non-volatile RAM (NVRAM), electrically erasable programmable ROM (EEPROM), flash memory, and the like. One or more memory devices of the memory may store computer readable instructions that, when executed by the processing circuitry, cause the processing circuitry to implement the techniques attributed herein to the processing circuitry.

Elements of controller 102 and/or the processing circuitry of controller 102 may be programmed with various forms of software. The processing circuitry may be implemented at least in part as, or include, one or more executable applications, application modules, libraries, classes, methods, objects, routines, subroutines, firmware, and/or embedded code, for example. The processing circuitry may be configured to receive voltage signals, determine switching frequencies, and deliver control signals.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

The following examples may illustrate one or more aspects of the disclosure.

Example 1

A circuit for overvoltage protection comprising: a gate driver module configured to selectively activate a switching element to provide input power to a primary side winding of a transformer for generating a target output at a secondary side winding of the transformer; and an overvoltage protection module configured to: determine a transition threshold based on a previously sensed supply voltage at a voltage supply pin configured to receive power for operating the circuit from a primary side auxiliary winding of the transformer; and determine the circuit is operating in an overvoltage condition when a current supply voltage at the voltage supply pin exceeds the transition threshold, wherein the current supply voltage occurs at the supply pin after the previously sensed supply voltage.

Example 2

The circuit of example 1, wherein, to selectively activate the switching element, the gate driver module is configured to activate the switching element based on a zero crossing detection (ZCD) voltage at a ZCD pin configured to receive a representation of a voltage at the primary side auxiliary winding.

Example 3

The circuit of any combination of examples 1-2, wherein, to determine the transition threshold, the overvoltage protection module is configured to: add an offset to the current supply voltage to generate an offset threshold.

Example 4

The circuit of any combination of examples 1-3, wherein, to determine the transition threshold, the overvoltage protection module is configured to: determine a minimum of a startup threshold, a previous offset minimum threshold, and the offset threshold to generate an offset minimum threshold.

Example 5

The circuit of any combination of examples 1-4, wherein, to determine the transition threshold, the overvoltage protection module is configured to: determine a maximum of a steady state threshold and the offset minimum threshold, wherein the steady state threshold is less than the startup threshold.

Example 6

The circuit of any combination of examples 1-5, wherein, to determine the transition threshold, the overvoltage protection module is configured to determine the transition threshold before a time duration initiated at a startup of the circuit exceeds a time threshold, and wherein the overvoltage protection module is configured to: after the time duration initiated at the startup of the circuit exceeds the time threshold, determine the circuit is operating in the overvoltage condition when the current supply voltage exceeds the steady state threshold.

Example 7

The circuit of any combination of examples 1-6, wherein the overprotection module is configured to: in response to determining the circuit is operating in the overvoltage condition, deactivate the gate driver module while the current supply voltage exceeds a startup threshold, wherein the gate driver refrains from activating the switching element when deactivated.

Example 8

The circuit of any combination of examples 1-7, wherein the target output is a first target output, wherein the secondary side winding is a first secondary side winding, and wherein the gate driver is further configured to selectively activate the switching element to provide the input power to the primary side winding for generating a second target output at a second secondary side winding of the transformer.

Example 9

The circuit of any combination of examples 1-8, wherein circuit comprises an analog-to-digital converter or one or more comparators, the analog-to-digital converter or one or more comparators being configured to: detect the previously sensed supply voltage and output a representation of the previously sensed supply voltage to the overvoltage protection module, wherein the overvoltage protection module is configured to determine the transition threshold using the representation of the previously sensed supply voltage; and detect, after detecting the previously sensed supply voltage, the current supply voltage and output a representation of the current supply voltage to the overvoltage protection module, wherein the overvoltage protection module is configured to determine the circuit is operating in the overvoltage condition using the representation of the current supply voltage.

Example 10

The circuit of any combination of examples 1-9, wherein the overvoltage protection module comprises a comparator configured to determine whether the current supply voltage at the voltage supply pin exceeds the transition threshold.

Example 11

A method for overvoltage protection comprising: selectively activating, by a circuit, a switching element to provide input power to a primary side winding of a transformer for generating a target output at a secondary side winding of the transformer; determining, by the circuit, a transition threshold based on a previously sensed supply voltage at a voltage supply pin configured to receive power for operating the circuit from a primary side auxiliary winding of the transformer; and determining, by the circuit, the circuit is operating in an overvoltage condition when a current supply voltage at the voltage supply pin exceeds the transition threshold, wherein the current supply voltage occurs at the supply pin after the previously sensed supply voltage.

Example 12

The method of example 11, wherein selectively activating the switching element comprises activating the switching element based on a zero crossing detection (ZCD) voltage at a ZCD pin configured to receive a representation of a voltage at the primary side auxiliary winding.

Example 13

The method of any combination of examples 11-12, wherein determining the transition threshold comprises adding an offset to the current supply voltage to generate an offset threshold.

Example 14

The device of any combination of examples 11-13, wherein determining the transition threshold comprises determining a minimum of a startup threshold, a previous offset minimum threshold, and the offset threshold to generate a offset minimum threshold.

Example 15

The method of any combination of examples 11-14, wherein determining the transition threshold comprises determining a maximum of a steady state threshold and the offset minimum threshold, wherein the steady state threshold is less than the startup threshold.

Example 16

The method of any combination of examples 11-15, wherein determining the transition threshold is before a time duration initiated at a startup of the circuit exceeds a time threshold, the method further comprising: after the time duration initiated at the startup of the circuit exceeds the time threshold, determining, by the circuit, the circuit is operating in the overvoltage condition when the current supply voltage exceeds the steady state threshold.

Example 17

The method of any combination of examples 11-16, further comprising: in response to determining the circuit is operating in the overvoltage condition, refraining from activating the switching element while the current supply voltage exceeds a startup threshold.

Example 18

The method of any combination of examples 11-17, wherein the target output is a first target output, wherein the secondary side winding is a first secondary side winding, the method further comprising selectively activating the switching element to provide the input power to the primary side winding for generating a second target output at a second secondary side winding of the transformer.

Example 19

A power converter system comprising: a transformer comprising a primary side winding, a primary side auxiliary winding, and a secondary side winding; a voltage supply pin configured to receive power for operating the power converter circuit from the primary side auxiliary winding; a switching element configured to establish a channel providing input power to the primary side winding when activated; a gate driver module configured to selectively activate the switching element to generate a target output at the secondary side winding; and an overvoltage protection module configured to: determine a transition threshold based on a previously sensed supply voltage at the voltage supply pin; and determine the circuit is operating in an overvoltage condition when a current supply voltage at the voltage supply pin exceeds the transition threshold, wherein the current supply voltage occurs at the supply pin after the previously sensed supply voltage.

Example 20

The power converter system of example 19, wherein the target output is a first target output, wherein the secondary side winding is a first secondary side winding, wherein the transformer further comprises a second secondary side winding, and wherein the gate driver is further configured to selectively activate the switching element to generate a second target output at the second secondary side winding.

Various aspects have been described in this disclosure. These and other aspects are within the scope of the following claims.

The invention claimed is:

1. A circuit for overvoltage protection comprising:
   a gate driver module configured to selectively activate a switching element to provide input power to a primary side winding of a transformer for generating a target output at a secondary side winding of the transformer; and
   an overvoltage protection module configured to:
      determine a transition threshold based on a previously sensed supply voltage at a voltage supply pin configured to receive power for operating the circuit from a primary side auxiliary winding of the transformer, wherein, to determine the transition threshold, the overvoltage protection module is configured to:
         add an offset to a current supply voltage to generate an offset threshold; and
         determine a minimum of a startup threshold, a previous offset minimum threshold, and the offset threshold to generate an offset minimum threshold; and determine the circuit is operating in an overvoltage condition when the current supply voltage at the voltage supply pin threshold exceeds the transition threshold, wherein the current supply voltage occurs at the supply pin after the previously sensed supply voltage.

2. The circuit of claim 1, wherein, to selectively activate the switching element, the gate driver module is configured to activate the switching element based on a zero crossing detection (ZCD) voltage at a ZCD pin configured to receive a representation of a voltage at the primary side auxiliary winding.

3. The circuit of claim 1, wherein, to determine the transition threshold, the overvoltage protection module is configured to:
determine a maximum of a steady state threshold and the offset minimum threshold, wherein the steady state threshold is less than the startup threshold.

4. The circuit of claim 3, wherein, to determine the transition threshold, the overvoltage protection module is configured to determine the transition threshold before a time duration initiated at a startup of the circuit exceeds a time threshold, and wherein the overvoltage protection module is configured to:
after the time duration initiated at the startup of the circuit exceeds the time threshold, determine the circuit is operating in the overvoltage condition when the current supply voltage exceeds the steady state threshold.

5. The circuit of claim 1, wherein the overprotection module is configured to:
in response to determining the circuit is operating in the overvoltage condition, deactivate the gate driver module while the current supply voltage exceeds a startup threshold, wherein the gate driver refrains from activating the switching element when deactivated.

6. The circuit of claim 1, wherein the target output is a first target output, wherein the secondary side winding is a first secondary side winding, and wherein the gate driver is further configured to selectively activate the switching element to provide the input power to the primary side winding for generating a second target output at a second secondary side winding of the transformer.

7. The circuit of claim 1, wherein circuit comprises an analog-to-digital converter or one or more comparators, the analog-to-digital converter or one or more comparators being configured to:
detect the previously sensed supply voltage and output a representation of the previously sensed supply voltage to the overvoltage protection module, wherein the overvoltage protection module is configured to determine the transition threshold using the representation of the previously sensed supply voltage; and
detect, after detecting the previously sensed supply voltage, the current supply voltage and output a representation of the current supply voltage to the overvoltage protection module, wherein the overvoltage protection module is configured to determine the circuit is operating in the overvoltage condition using the representation of the current supply voltage.

8. The circuit of claim 1, wherein the overvoltage protection module comprises a comparator configured to determine whether the current supply voltage at the voltage supply pin exceeds the transition threshold.

9. A method for overvoltage protection comprising:
selectively activating, by a circuit, a switching element to provide input power to a primary side winding of a transformer for generating a target output at a secondary side winding of the transformer;
determining, by the circuit, a transition threshold based on a previously sensed supply voltage at a voltage supply pin configured to receive power for operating the circuit from a primary side auxiliary winding of the transformer, wherein determining the transition threshold comprises:
adding an offset to a current supply voltage to generate an offset threshold; and
determining a minimum of a startup threshold, a previous offset minimum threshold, and the offset threshold to generate an offset minimum threshold; and
determining, by the circuit, the circuit is operating in an overvoltage condition when the current supply voltage at the voltage supply pin exceeds the transition threshold, wherein the current supply voltage occurs at the supply pin after the previously sensed supply voltage.

10. The method of claim 9, wherein selectively activating the switching element comprises activating the switching element based on a zero crossing detection (ZCD) voltage at a ZCD pin configured to receive a representation of a voltage at the primary side auxiliary winding.

11. The method of claim 9, wherein determining the transition threshold comprises determining a maximum of a steady state threshold and the offset minimum threshold, wherein the steady state threshold is less than the startup threshold.

12. The method of claim 11, wherein determining the transition threshold is before a time duration initiated at a startup of the circuit exceeds a time threshold, the method further comprising:
after the time duration initiated at the startup of the circuit exceeds the time threshold, determining, by the circuit, the circuit is operating in the overvoltage condition when the current supply voltage exceeds the steady state threshold.

13. The method of claim 9, further comprising:
in response to determining the circuit is operating in the overvoltage condition, refraining from activating the switching element while the current supply voltage exceeds a startup threshold.

14. The method of claim 9, wherein the target output is a first target output, wherein the secondary side winding is a first secondary side winding, the method further comprising selectively activating the switching element to provide the input power to the primary side winding for generating a second target output at a second secondary side winding of the transformer.

15. A power converter system comprising:
a transformer comprising a primary side winding, a primary side auxiliary winding, a first secondary side winding, and a second secondary side winding;
a voltage supply pin configured to receive power for operating the power converter circuit from the primary side auxiliary winding;
a switching element configured to establish a channel providing input power to the primary side winding when activated;
a gate driver module configured to selectively activate the switching element to generate a first target output at the first secondary side winding and to selectively activate the switching element to generate a second target output at the second secondary side winding; and an overvoltage protection module configured to:
   determine a transition threshold based on a previously sensed supply voltage at the voltage supply pin; and
   determine the circuit is operating in an overvoltage condition when a current supply voltage at the voltage supply pin exceeds the transition threshold, wherein the current supply voltage occurs at the supply pin after the previously sensed supply voltage.

* * * * *